July 7, 1970  W. P. DEVEREUX  3,519,350
STADMETRIC RANGE FINDER HAVING THREE LINES OF SIGHT
Filed Jan. 24, 1968  3 Sheets-Sheet 1
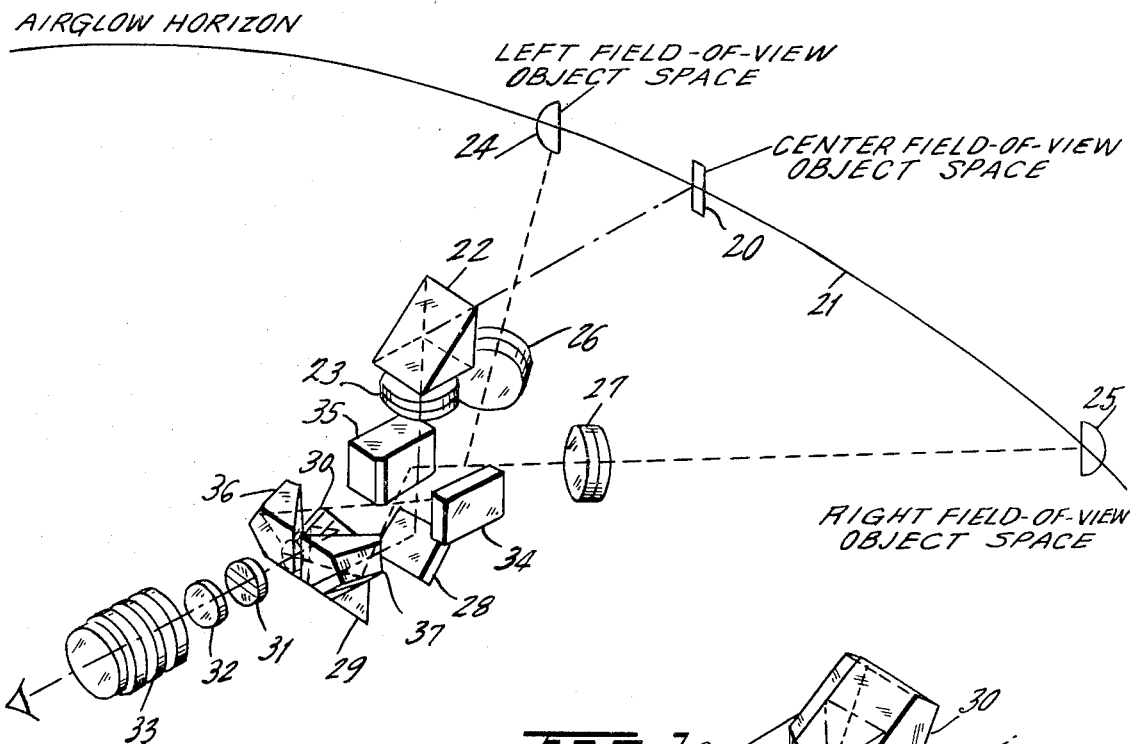
FIG. 1.
FIG. 1a.
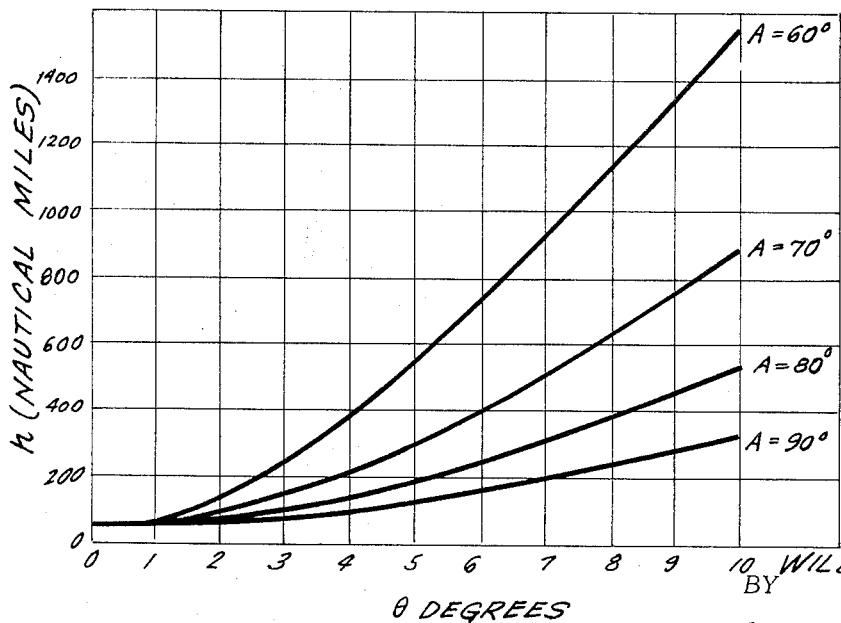
$h$ = ALTITUDE
$\theta$ = DEFLECTION ANGLE
FIG. 5.
INVENTOR.
WILLIAM P. DEVEREUX
BY
OSTROLENK, FABER, GERB & SOFFEN
ATTORNEYS July 7, 1970 W. P. DEVEREUX 3,519,350
STADMETRIC RANGE FINDER HAVING THREE LINES OF SIGHT
Filed Jan. 24, 1968 3 Sheets-Sheet 2

INVENTOR.
WILLIAM P. DEVEREUX
BY
OSTROLENK, FABER, GERB & SOFFEN
ATTORNEYS

July 7, 1970 W. P. DEVEREUX 3,519,350
STADMETRIC RANGE FINDER HAVING THREE LINES OF SIGHT
Filed Jan. 24, 1968 3 Sheets-Sheet 3
FIG. 6.
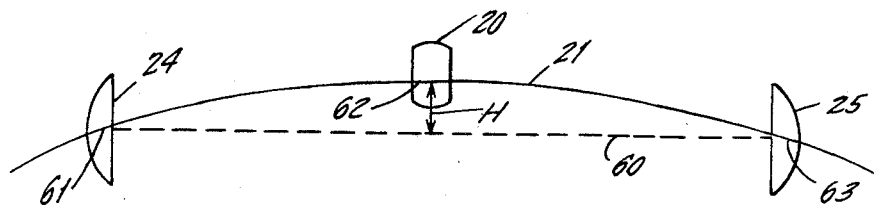
FIG. 8a.     FIG. 8b.     FIG. 8c.
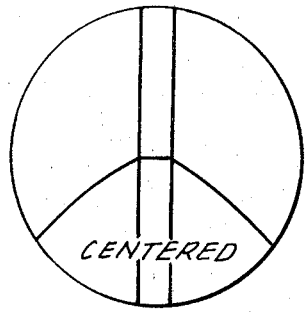 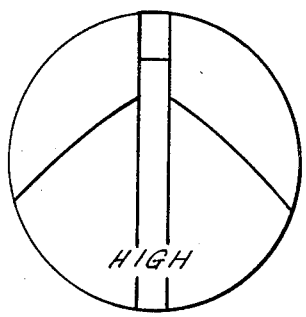 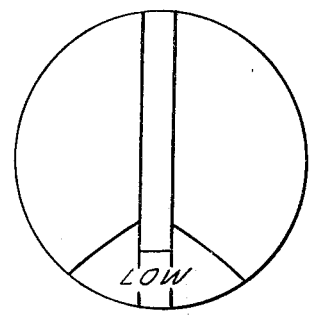
FIG. 9a.     FIG. 9b.
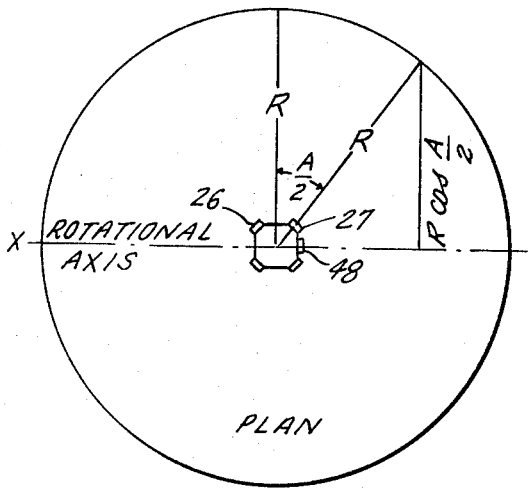 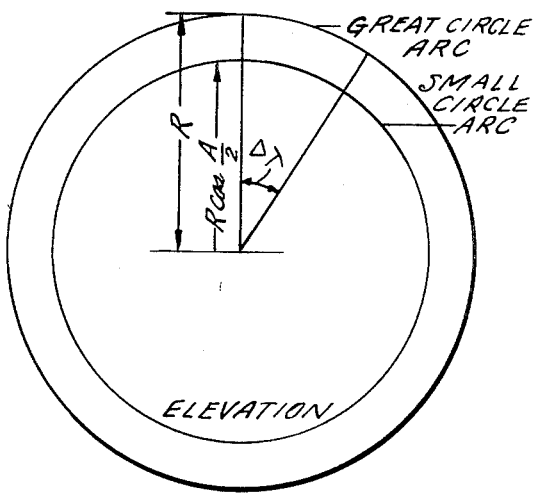
PLAN     ELEVATION
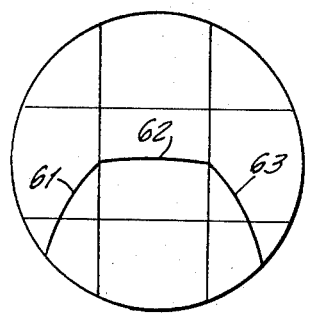
FIG. 7.
INVENTOR.
WILLIAM P. DEVEREUX
BY
OSTROLENK, FABER, GERB & SOFFEN
ATTORNEYS

United States Patent Office 3,519,350
Patented July 7, 1970

3,519,350
STADIMETRIC RANGE FINDER HAVING THREE LINES OF SIGHT
William P. Devereux, Syosset, N.Y., assignor to Kollsman Instrument Corporation, Syosset, N.Y., a corporation of New York
Filed Jan. 24, 1968, Ser. No. 700,138
Int. Cl. G01c 3/00
U.S. Cl. 356—21                                 8 Claims

ABSTRACT OF THE DISCLOSURE

An instrument for measuring height above a spherical body such as a planet by measuring the height of the arc above the center of a chord of the horizon. Three telescopes having separate objectives and a common eyepiece respectively observe a central point of the horizon and two equally displaced side regions. The telescope axes have a constant angular separation, and the central telescope line of sight is adjustable perpendicular to the plane of the telescope axes to juxtapose the image portions of the three telescopes in a common display. The adjustment of the line of sight of the central telescope indicates the height of the arc above the chord of the planet observed, thereby indicating distance from the planet. The focal length of the objective of the central telescope is reduced from the focal length of the side telescopes proportional to the cosine of the angle between the optical axis of the side and central telescopes.

---

This invention relates to stadimeters, and more particularly relates to a stadimeter for measuring distance to a spherical body of known diameter such as a planet or the moon.

In accordance with the invention, a central telescope is directed at a central portion of the periphery of a curved body, such as the air-glow horizon of the earth, while two side telescopes are directed at horizon portions on opposite sides of the central portion. The angles between the telescopes are fixed, and their images are displayed in a common eyepiece. The adjacent sections of the images are brought into alignment by raising or lowering the central telescopes line of sight, whereby the adjustment is a function of the height of the center of the arc observed above the center of the chord having end points which are the points observed by the side telescopes. Since the angle between the two side telescopes is fixed, and the diameter of the body is known, the distance to the body is determined.

Accordingly, a primary object of this invention is to measure the apparent curvature of a remotely situated arc.

Another object of this invention is to provide an instrument to measure distance to a celestial body.

A further object of this invention is to provide a visual display in the form of a split field to permit matching of specific points of a horizon image.

These and other objects of this invention will become apparent from the following description when taken in connection with the drawings, in which:

FIG. 1 is a perspective diagram of the optical system of the stadimeter of the present invention.

FIG. 1a is an enlarged view of two of the prisms of FIG. 1.

Figure 2:
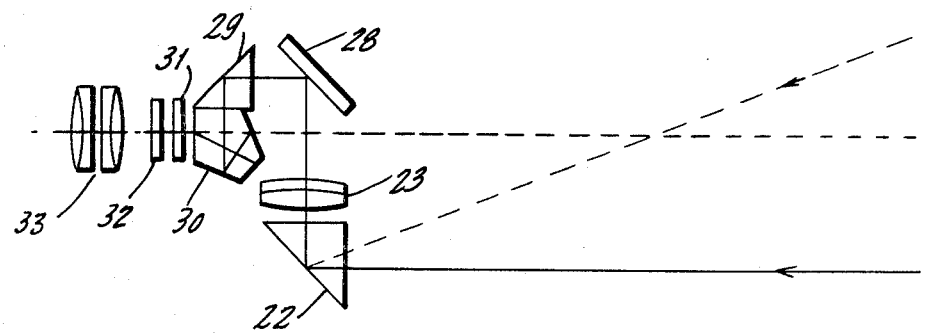
FIG. 2 is a side elevation view of the center line of sight telescope of FIG. 1.
Figure 3:
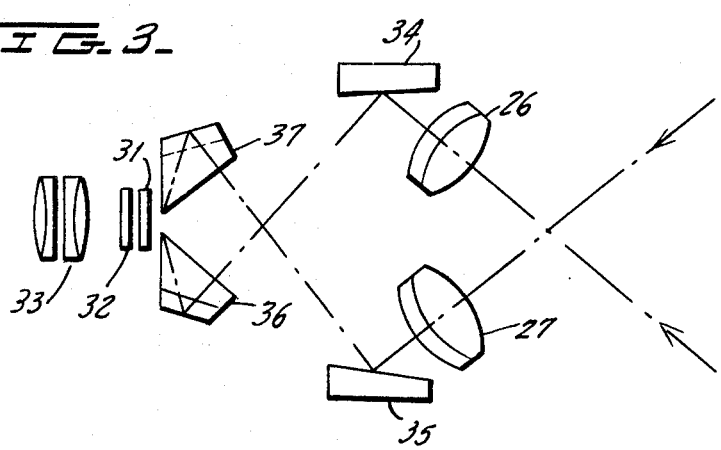
FIG. 3 is a schematic plan view of the side line of sight telescopes of FIG. 1.
Figure 4:
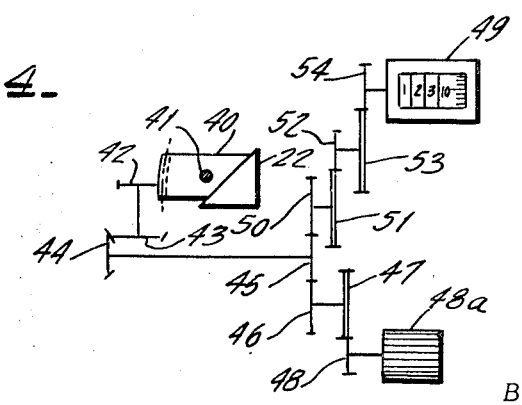

FIG. 4 schematically shows the connection between the adjustment prism of the center telescope and the distance indicator.

FIG. 5 shows calibration curves for height above the earth in nautical miles as a function of the angular deviation of the axis of the central telescope above the plane of the axes of the side telescopes for various fixed angles between the axes of the side telescopes.

FIG. 6 schematically shows the horizon and the three sections of the horizon that are observed by the three telescopes.

FIG. 7 shows the images of the three separate fields of view of FIG. 6 combined into a single display with the images brought into coincidence.

FIGS. 8a, 8b and 8c show the reticle display without telescope compensation when the image is centered, high and low, respectively.

FIGS. 9a and 9b are plan and elevation views, respectively, of mathematical diagrams showing the novel compensation design for preventing the image shifts of FIGS. 8b and 8c.

Referring first to FIGS. 1, 1a, 2 and 3, the optical system is comprised of a central telescope and two side telescopes. The central telescope observes a central field of view 20 on a horizon 21 through an index prism 22, and objective lens 23. The two side telescopes observe fields of view 24 and 25 on the horizon 21 through objective lenses 26 and 27, respectively.

The image path of the central telescope, shown in FIG. 1 in the dot-dash line, is then reflected by mirror 28 toward the right isosceles prism 29 and penta roof prism 30 which erects the image. Other image erection means could be used. The light path then progresses through a suitable reticle 31, air-glow filter 32, and to a high accuracy eyepiece 33.

The two side telescopes have optical paths extending from their objectives 26 and 27 which include reflecting mirrors 34 and 35, respectively, and roof prisms 36 and 37, respectively, which erect the side images and direct the respective image portions through reticle 31 and filter 32, and toward eyepiece 33. Note that prisms 29, 30, 36 and 37 are cemented together as a unit.

The lines of sight of the two side telescope objectives 26 and 27 form a plane, and the line of sight of the center objective 23 is adjustable perpendicularly to this plane. This is accomplished by rotatably mounting prism 22 as shown in FIG. 4. Referring to FIG. 4, prism 22 has a gear portion 40 extending therefrom which may be pivotally mounted on pivot 41. A gear train schematically illustrated as containing gears 42 to 48 is then connected to a mechanical adjustment knob 48a which can turn prism 22 through any desired angle such as 10°. The gear 45 is also connected to a counter 49 through the schematically shown gear train including gears 50 to 54. In particular, counter 49 can indicate height according to FIG. 5 which shows the angle of the center line of sight above the plane of the side lines of sight for the planet Earth, for different fixed angles A between the side lines of sight.

FIG. 6 shows the horizon and regions thereof which are observed by the three telescopes, while FIG. 7 shows their juxtaposed presentation in eyepiece 33. The system, in effect, measures the height H above the chord 60 to the center of the horizon arc. The three horizon segments 61, 62 and 63 in fields 24, 20 and 25 of FIG. 6 are juxtaposed by one another on the reticle, as shown in FIG. 7, with adjustment knob 48a adjusting the angle of view of the central telescope until the edges of segments 61, 62 and 63 are aligned, as in FIG. 7. The counter 49 is then read directly for height above the body.

In accordance with an important feature of the invention, the focal length of the objective 23 is less than that of the side objectives 26 and 27. For example, in one design, objective 23 had a focal length of 105 millimeters, while objectives 26 and 27 had focal lengths of 148 millimeters.

This is done to prevent relative shifting of the images of the central horizon portion and the side portions of the horizon when they are not centered in the field. Thus, a proper presentation is obtained as in FIG. 8a when centered in the field, but shift, as shown in FIGS. 8b and 8c, when they are high or low, respectively, in the field of view. This is caused because any departure of the image from the center causes the central image to move through an apparently larger displacement than the side images.

Imagine the instrument in the center of a sphere in FIG. 9a and rotating in a plane through its axis and perpendicular to the plane established by the side lines of sight. The central line of sight describes a great circle on the sphere while the side lines of sight describe small circles, as shown in FIG. 9b. The ratio of circumference of these circles is the cosine of the angle between the center line of sight and the side lines of sight. For any given angle of rotation the side line of sight moves through an angle that bears this cosine relationship to the angle swept by the center line of sight. In the absence of a correction, the center image will apparently move more than the side images. To correct this, the magnifying power of the center telescope must be reduced the same cosine multiple of the side line of sight. Since the eyepiece 33 is common to all lines of sight, the correction must be made in the objective lens 23. For a 45° half angle between the side lines of sight, the focal length of the central line of sight was reduced from 148 mm. to 148 × .7071 or 105 mm. For different angles between lines of sight, the ratio of focal lengths must be determined by the cosine of the angle used.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A stadimeter comprising first, second and third objective means and an eyepiece means common to said first, second and third objective means for observing juxtaposed images formed by said first, second and third objective means; said first, second and third objective means having respective lines of sight; said first and third lines of sight having a fixed angle therebetween and forming a plane; said second line of sight lying in a plane perpendicular to and bisecting said first mentioned plane, and optical adjustment means positioned in said second line of sight for adjusting the angle of said second line of sight relative to said first mentioned plane; at least one of said objective means having a focal length different from the focal length of the others of said objective means.

2. The stadimeter of claim 1 wherein said first and third objective means have the same focal length; said second objective means having a focal length generally equal to the product of the focal length of said first objective means and the cosine of half the angle between said first and third lines of sight.

3. The stadimeter as set forth in claim 1 wherein said adjustment means includes a prism.

4. The stadimeter as set forth in claim 1 which includes respective prism means for each of said first, second and third objective means interposed between said objectives and said eyepiece for erecting the images of said objective means and for directing said images toward said eyepiece.

5. The stadimeter as set forth in claim 2 which includes respective prism means for each of said first, second and third objective means interposed between said objective means and said eyepiece for erecting the images of said objective means and for directing said images toward said eyepiece.

6. The stadimeter as set forth in claim 4 which includes a reticle positioned between said prism means and said eyepiece.

7. The stadimeter as set forth in claim 4 which includes first and second spaced roof prisms for said first and third objective means, respectively, for forming spaced images on said eyepiece focal plane, and third prism means for said second objective means for forming an image on said eyepiece between said spaced images.

8. The stadimeter of claim 7 wherein said first and third objective means have the same focal length; said second objective means having a focal length generally equal to the product of the focal length of said first objective means and the cosine of half the angle between said first and third lines of sight.

References Cited

UNITED STATES PATENTS 1,339,006    5/1920    Sperry.

RONALD L. WIBERT, Primary Examiner

O. B. CHEW II, Assistant Examiner